3,071,539
CATALYTIC REFORMING OF PETROLEUM HYDROCARBONS
Frederick William Bertram Porter and Peter Thomas White, Sunbury-on-Thames, England, assignors to The British Petroleum Company Limited, London, England, a British joint-stock corporation
No Drawing. Filed May 11, 1959, Ser. No. 812,144
Claims priority, application Great Britain May 20, 1958
3 Claims. (Cl. 208—135)

This invention relates to the catalytic reforming of petroleum hydrocarbons to give products of increased octane number suitable for use in motor gasoline.

In catalytic reforming processes a naphtha fraction is contacted at elevated temperature and pressure and in the presence of hydrogen with a dehydrogenation catalyst to produce a gasoline fraction of increased octane number. Catalysts that are widely used commercially consist essentially of platinum on alumina with or without combined halogen. A catalytic reforming process using a platinum-on-alumina type catalyst will hereinafter be referred to as platinum reforming and the products as platinum reformates.

Platinum reforming is capable of giving products with octane numbers research (clear) of 95 or more but with the normal heavy naphtha feedstocks used, for example naphthas having a boiling range of about 90 to 175° C., the volatility of such products is comparatively low being of the order of 30–35% volume evaporated at 100° C. Although a product of increased volatility may be obtained by processing a lower boiling feedstock, more severe operating conditions are required to reach a given octane level with a consequent reduction in catalyst life.

The principal object of the present invention is to increase the volatility of platinum reformates.

According to the present invention a platinum reformate is fractionated into a higher-boiling fraction and a lower-boiling fraction, the higher-boiling fraction is contacted at elevated temperature with a catalyst consisting essentially of alumina and fluorine, and the treated higher-boiling fraction is re-combined with the lower-boiling fraction to give a product of increased volatility.

The platinum reformate is preferably produced by a platinum reforming process using a heavy naphtha feedstock and operating under conditions such that regeneration of the catalyst in situ is not required (i.e. a catalyst life of at least 40 barrels of feedstock processed per lb. of catalyst).

The term heavy naphtha means a naphtha having an ASTM final boiling point between 150° C. and 200° C. and, preferably, an ASTM initial boiling point within the range 70° C. to 100° C.

The platinum reforming stage is preferably operated to give a reformate having an octane number research (clear) of 90 to 100. Any convenient platinum reforming process may be used and the process conditions will normally fall within the following ranges:

Catalyst _____ 0.1–10% wt. platinum on alumina with or without 0.1–8% by wt. of halogen, particularly fluorine and/or chlorine.
Temperature _____ 600–1200° F., preferably 900–1000° F.
Pressure _____ 50–1000 p.s.i., preferably 300–700 p.s.i.
Space velocity_____ 0.5–10 v./v./hr., preferably 1–3 v./v./hr.
Molar hydrogen/hydrocarbon ratio _. 0.5–15, preferably 6–10.

The platinum reformate should be fractionated so that the higher-boiling fraction contains the majority of the alkyl benzenes and a convenient cut-point is in the range 80–130° C., particularly 100–120° C. The re-combined blend of treated heavy fraction and the light fraction should preferably have a volatility of at least 40% volume recovered at 100° C., more particularly 40 to 60%, and an octane number research (clear) of at least 90.

The alumina/fluorine catalyst may be prepared by impregnating alumina or a substance capable of forming alumina with hydrogen fluoride and a particularly suitable catalyst is one obtained by impregnating alumina or a substance capable of forming it, for example an alumina sol or gel, with hydrofluoric acid in aqueous solution. The quantity of fluorine, calculated as elemental fluorine, is preferably from 1–25% by weight of total catalyst, more particularly from 1–10%.

The catalyst is preferably used in the presence of added hydrogen, for example with a molar ratio of hydrogen to hydrocarbon of from 1:1 to 10:1. The preferred temperature is from 965–1200° F. although lower temperatures may also be effective. Pressures of from atmospheric up to 700 p.s.i.g. or more may also be used.

The invention is illustrated by the following example.

EXAMPLE

A 90–175° C. ASTM naphtha of Middle East origin was contacted with a catalyst of 0.56% wt. platinum and 0.65% wt. chlorine on eta-alumina, under conditions to give a product having an octane number (research) clear of 99.2. The reforming conditions were 980° F., 450 p.s.i.g., 1.5 v./v./hr., and 10:1 hydrogen/hydrocarbon mol ratio. The product had a volatility of 34.0% vol. evaporated at 100° C. and was obtained in 70.2% wt. yield on the naphtha feedstock. This platinum reformate was then fractionated at 100° C. into light and heavy fractions having the characteristics shown in Table 1 below.

Table 1

| Fraction | Boiling range ° C. (ASTM Dist.) | Yield on feed to splitter, percent wt. | O.N. Res. (Clear) |
|---|---|---|---|
| Light platinum reformate | 43–93 | 31.5 | 74.3 |
| Heavy platinum reformate | 111–204 | 68.5 | 107.8 |

The heavy fraction was then contacted with a catalyst of alumina impregnated with hydrogen fluoride. The treated fraction was then blended back with the light fraction. This catalyst was prepared as follows:

124 g. of ⅛″ x ⅛″ pelleted alumina were roasted at 550° C. for 2 hours. The warm pellets were impregnated with 62 g. of 40% wt. hydrochloric acid and dried at 140° C. for 2 hours. During drying the pellets were carefully raked over to break-up small agglomerations of pellets.

Process conditions for the treatment with the alumina/fluorine catalyst and inspection data on the blended material are given in Table 2 below:

*Table 2*

| Catalyst | Hydrogen/ hydrocarbon mol ratio | Pressure, p.s.i.g. | Temp., °F. | Space velocity, v./v./hr. | Blend of treated heavy reformate with light reformate | | |
|---|---|---|---|---|---|---|---|
| | | | | | Yield on naphtha feedstock, percent wt. | O.N. Res. (Clear) | Volatility, Percent vol. recovered at 100° C. |
| 5% wt. fluorine on alumina | 2:1 | 500 | 1,000 | 1.0 | 62.2 | 98.6 | 43.5 |
| Do | 2:1 | 500 | 1,050 | 0.5 | 63.0 | 99.0 | 43.0 |
| 7.2% wt. fluorine on alumina | 2:1 | 500 | 1,050 | 0.25 | 58.8 | 98.9 | 50.6 |

From the table it will be seen that the volatility of the platinum reformate has been increased by from 9–16% vol. without any appreciable loss of octane number.

We claim:
1. A process for increasing the volatility of platinum reformates produced from naphtha feedstocks having an ASTM initial boiling point within the range 70° C. to 100° C. and having an ASTM final boiling point within the range 150° C. to 200° C., by a platinum reforming process operating under non-regenerative conditions such that a catalyst life of at least 40 barrels of feedstock processed per lb. of catalyst is obtained and regeneration of the catalyst in situ is not required, comprising fractionating the reformate having an octane number research (clear) of from 90 to 100, into a higher-boiling fraction containing the majority of the alkyl benzenes of the reformate and a lower-boiling fraction containing $C_6$ and lower-boiling hydrocarbons of the reformate, the cut-point between the higher-boiling and the lower-boiling fractions being from 80° to 130° C.; contacting the higher-boiling fraction at a temperature in the range 965° to 1200° F. and in the presence of added hydrogen, with a molar hydrogen/hydrocarbon ratio of from 1:1 to 10:1, with a dealkylation catalyst consisting essentially of alumina and fluorine, the quantity of fluorine, calculated as elemental fluorine, being from 1% to 25% by weight of total catalyst; and recombining the treated higher-boiling fraction with the lower-boiling fraction, said recombined product having a volatility of from 40% to 60% volume recovered at 100° C. and an octane number research (clear) of at least 90.

2. A process as claimed in claim 1, wherein the cut-point between the higher- and lower-boiling fractions is from 100 to 120° C.

3. A process as claimed in claim 1, wherein the dealkylation catalyst contains from 1 to 10% wt. of fluorine.

References Cited in the file of this patent

UNITED STATES PATENTS

| | | |
|---|---|---|
| 2,361,138 | Voorhies | Oct. 24, 1944 |
| 2,380,279 | Welty | July 10, 1945 |
| 2,383,072 | Oblad | Aug. 21, 1945 |
| 2,848,380 | Thomas | Aug. 19, 1958 |
| 2,889,263 | Hemminger et al. | June 2, 1959 |

FOREIGN PATENTS

| | | |
|---|---|---|
| 153,199 | Australia | Sept. 15, 1953 |

UNITED STATES PATENT OFFICE

CERTIFICATE OF CORRECTION

Patent No. 3,071,539            January 1, 1963

Frederick William Bertram Porter et al.

It is hereby certified that error appears in the above numbered patent requiring correction and that the said Letters Patent should read as corrected below.

Column 1, line 60, for "without 0.1-8% by wt." read -- without 0.1-8% wt. --; column 2, line 61, for "hydrochloric acid" read -- hydrofluoric acid --.

Signed and sealed this 8th day of October 1963.

(SEAL)
Attest:

ERNEST W. SWIDER
Attesting Officer

EDWIN L. REYNOLDS
Acting Commissioner of Patents